(12) United States Patent
Dave et al.

(10) Patent No.: US 9,817,905 B2
(45) Date of Patent: Nov. 14, 2017

(54) PROFILE PERSONALIZATION BASED ON VIEWER OF PROFILE

(71) Applicant: LinkedIn Corporation, Mountain View, CA (US)

(72) Inventors: Nipun Dave, Mountain View, CA (US); Sachit Kamat, San Carlos, CA (US); Nikita Igorevych Lytkin, Sunnyvale, CA (US); Vibha Rathi, Cupertino, CA (US); Jibran Kutik, Mountain View, CA (US); Mathieu Bastian, San Francisco, CA (US); Matthieu F. Monsch, San Francisco, CA (US); Xin Hu, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/674,755

(22) Filed: Mar. 31, 2015

(65) Prior Publication Data
US 2016/0292280 A1    Oct. 6, 2016

(51) Int. Cl.
*G06F 17/30*    (2006.01)
(52) U.S. Cl.
CPC .... *G06F 17/30867* (2013.01); *G06F 17/3053* (2013.01)
(58) Field of Classification Search
None
See application file for complete search history.

(56) References Cited

U.S. PATENT DOCUMENTS

| 8,180,804 | B1 * | 5/2012 | Narayanan et al. ........... 707/798 |
| 8,413,060 | B1 * | 4/2013 | Agrawal ................. H04L 51/04 709/204 |
| 8,977,611 | B2 * | 3/2015 | Tseng ........................... 707/728 |
| 2004/0153444 | A1 * | 8/2004 | Senders ............ G06F 17/30687 |
| 2012/0166532 | A1 * | 6/2012 | Juan ....................... G06Q 50/01 709/204 |
| 2013/0031090 | A1 * | 1/2013 | Posse ................ G06F 17/30867 707/723 |

(Continued)

FOREIGN PATENT DOCUMENTS

AU    WO 2008043143 A1 *    4/2008    ............. G06Q 10/10

*Primary Examiner* — Aleksandr Kerzhner
*Assistant Examiner* — Eddy Cheung
(74) *Attorney, Agent, or Firm* — Schwegman Lundberg & Woessner, P.A.

(57) ABSTRACT

Techniques for presenting a personalized member profile page to a viewer are described. A highlight module can receive a request to view a profile page of a member in a social network. The highlight module can access viewer data of a viewer associated with the request, and access member data of the member. Additionally, the highlight module can determine a plurality of member attributes relevant to the viewer based on the viewer data, the plurality of member attributes being derived from the member data. Furthermore, the highlight module can calculate an overall score for a member attribute in the plurality of member attributes based on the viewer data and the member data. Subsequently, a profile generation module can cause a presentation, on a display of a device, of the member attribute on the profile page, when the overall score of the member attribute is higher than a predetermined threshold value.

23 Claims, 9 Drawing Sheets

(56) References Cited

U.S. PATENT DOCUMENTS

| | | | |
|---|---|---|---|
| 2013/0080427 A1* | 3/2013 | Cross et al. | 707/728 |
| 2013/0086078 A1* | 4/2013 | Malleshaiah | G06Q 30/02 707/748 |
| 2013/0124538 A1* | 5/2013 | Lee et al. | 707/749 |
| 2013/0232200 A1* | 9/2013 | Knapp | H04L 67/306 709/204 |
| 2014/0089780 A1* | 3/2014 | Garcia-Martinez | G06F 17/30 715/234 |
| 2014/0244531 A1* | 8/2014 | Baldwin | G06Q 50/01 705/319 |
| 2014/0244561 A1* | 8/2014 | Cheng | G06Q 50/01 706/46 |
| 2014/0324846 A1* | 10/2014 | Rekhi | G06Q 10/10 707/725 |
| 2014/0337436 A1* | 11/2014 | Hoagland et al. | 709/204 |
| 2015/0127565 A1* | 5/2015 | Chevalier et al. | 705/319 |

\* cited by examiner

FIG. 8

PROFILE PERSONALIZATION BASED ON VIEWER OF PROFILE

TECHNICAL FIELD

This application relates generally to social networking and more particularly to a social networking system which allows profile personalization of a member profile based on information accessed from a profile of a viewer. The present disclosure additionally relates to processes for generating a ranked list of relevant member attributes to present to the viewer.

BACKGROUND

Social networks provide a platform for a user to interact, make connections, and collaborate with an online community of people with similar interests, needs, and goals. A social network can include a member profile (e.g., profile page) for each member of the social network. The member profile of a member can be modified by the member. Additionally, the social network system can allow viewers to view a member profile. For example, a member profile may include contact information, educational information, employment information, connections to other members, skills, and interests.

BRIEF DESCRIPTION OF THE DRAWINGS

Some embodiments are illustrated by way of example and not limitation in the figures of the accompanying drawings.

FIG. 8 is an example of a personalized member profile in a social network system, according to various embodiments.

DETAILED DESCRIPTION

Figure 1:
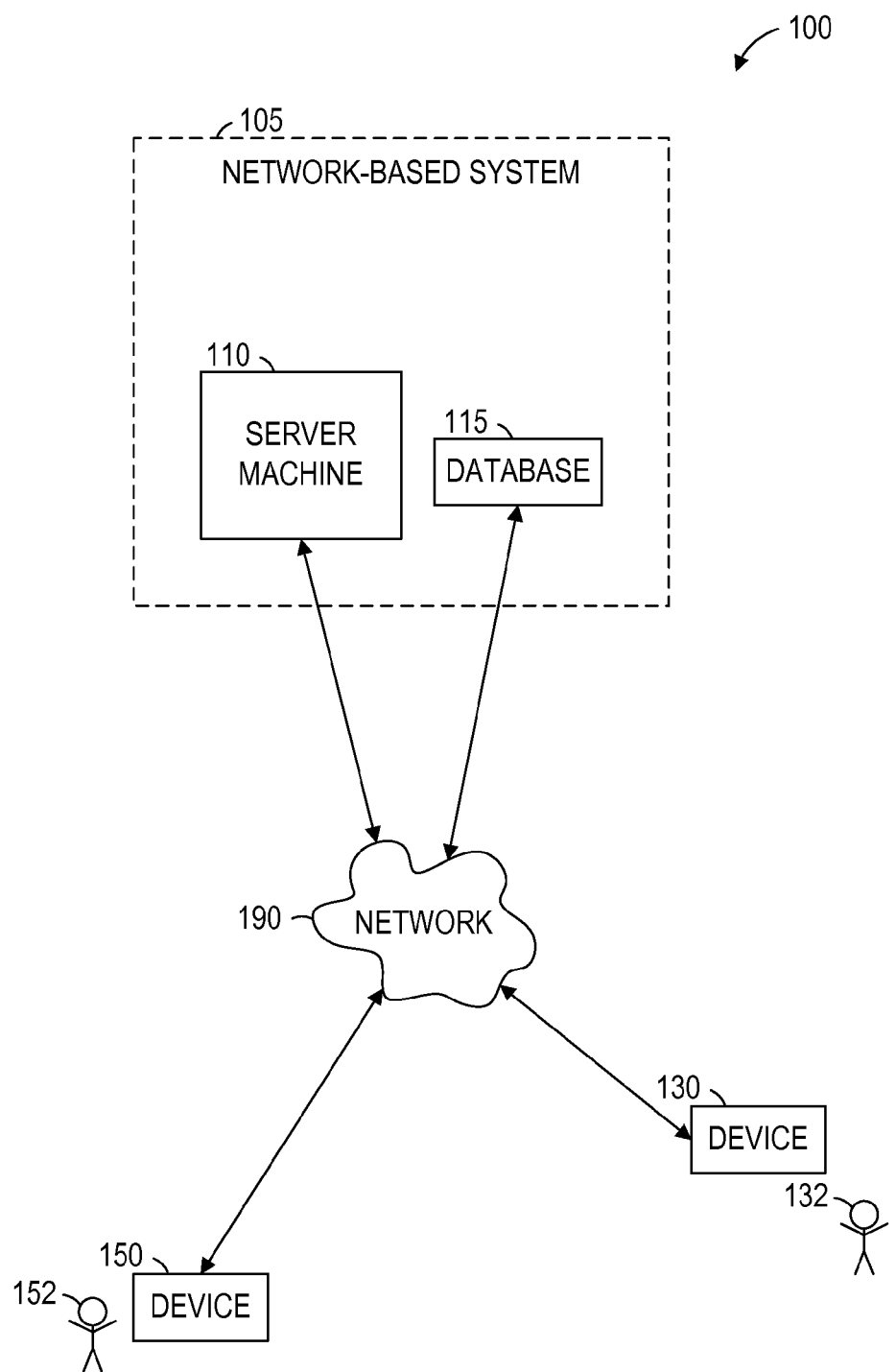
FIG. 1 is a network diagram illustrating a network environment suitable for a social network, according to various embodiments.

Example methods and systems are directed to techniques for personalizing a member profile (e.g., profile page) of a member based on information accessed from a viewer of the member profile. More specifically, the present disclosure relates to methods, systems, and computer program products for ranking member attributes of a member using an overall score based on a relevancy to the viewer. In some instances, a predetermined number of member attributes with high overall scores are presented on the member profile. For example, based on a specific viewer, a member profile can be personalized to include at least one (e.g., top three ranked) featured member attributes to be presented to the specific viewer, the featured member attribute having an overall score higher than the scores associated with other member attributes to be presented to the specific viewer.

A social network can allow viewers to view profile pages of a member in the social network. The member profile of a member can be a personalized profile that presents member attributes (e.g., profile highlights) on the profile page. The social network system can use an algorithm to determine (e.g., identify) member attributes of the member that are relevant (e.g., calculated based on common attributes) to the viewer of the profile page. In some instances, the member attributes can be ranked based on an overall score.

For example, a profile page can include profile data such as contact information, educational information, career information, connections, skills, and interests. In order to capture the viewer's attention, the member attributes with high scores that are presented on the profile page can be highlighted or emphasized. A member attribute is specific to the viewer. Additionally, the member attribute (e.g., profile highlight) can either be an entity attribute, a network attribute, or an event attribute.

Entity attributes can be attributes that are in common between the member of the profile page and the viewer of the profile page. By way of example, an entity attribute (e.g., profile highlight) can be that both the member and the viewer were at the same company for three years. In some instance, the entity attribute can be time-specific, such as stating that the member joined Company A two years prior to the viewer joining Company A. Additionally, entity attributes include profile data information that is relevant or beneficial to the viewer, such as common educational background, common skills, common endorsements, common interests, and so on.

Network attributes can include a member's connections that are relevant to the viewer. In some instances, the network attribute (e.g., profile highlight) can be the number of first-degree connections that the member has at Company A. Additionally, the network attribute can include subtypes, such as the number of first-degree connections at different levels (e.g., executive, human resources) in Company A. For example, the social network system can present, as a profile highlight, the number of programmers at Company A that are connected to the member. Additionally, the network attribute can include common connections between the member and the viewer, such as the member having a determined number of common connections at Company A with the viewer. Furthermore, a network attribute can include a percentage of connections that member has in a particular space (e.g., employment industry). For example, the profile highlight can present that the member has a calculated percentage of more connections in a specific industry (e.g., legal) than the viewer. The network attribute can include any network-related information based on social graph data that can be relevant or beneficial to the viewer.

Event attributes can include postings published by the member, articles associated with the member, birthday of the member, professional relationship opportunities (PROPs), and so on. Event attributes include member behavior and activity data that can be relevant or beneficial to the viewer.

A highlight module can determine the member attributes (e.g., entity attribute, network attribute, and event attribute) to include in a member profile page for a specific viewer. A profile page generation module can generate and present the profile page of the member to the viewer. In some instances, the profile page generation module can emphasize or highlight the member attribute to capture the viewer's attention.

Additionally, once the member attribute (e.g., highlight) is selected by the viewer, the social network can determine and recommend (e.g., present) an action to the viewer based on the selection. For example, the social network can recommend emailing or messaging the member.

In some instances, the viewer can select (e.g., click) the member attribute (e.g., highlight) presented on the profile page of the member. Based on the selection, a selection module can determine a list of recommended actions to present to the viewer. The list of recommended actions can be presented in a popup window in response to the viewer clicking the highlight.

Furthermore, the viewer can confirm (e.g., approve) performing the recommended action. An action module can perform the action in response to the viewer's confirmation. For example, based on the viewer confirming to contact the member about a specific job opportunity, the action module can generate a message to the member about the specific job opportunity on behalf of the member.

Techniques described herein can determine the relevant (e.g., featured) member attributes for a viewer, and present the relevant member attributes as profile highlights in a profile page of a member. The relevancy of a member attribute can be based on an overall score calculated using the viewer's information and the member data. The profile highlights can increase member engagement (e.g., increase new connections between members, increase messaging between members) in the social network system, which increases advertisement revenues for the social network system.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for a social network service, according to some example embodiments. The network environment 100 includes a server machine 110, a database 115, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store member data (e.g., profile data, social graph data) for the social network service. The server machine 110, the first device 130, and the second device 150 may each be implemented in a computer system, in whole or in part, as described below with respect to FIG. 9.

Also shown in FIG. 1 are the users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases 115, or devices 130, 150 shown in FIG. 1 may be implemented in a general-purpose computer modified (e.g., configured or programmed) by software (e.g., one or more software modules) to be a special-purpose computer to perform one or more of the functions described herein for that machine, database 115, or device 130, 150. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases 115, or devices 130, 150 illustrated in FIG. 1 may be combined into a single machine, database 115, or device 130, 150, and the functions described herein for any single machine, database 115, or device 130, 150 may be subdivided among multiple machines, databases 115, or devices 130, 150.

The network 190 may be any network that enables communication between or among machines, databases 115, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
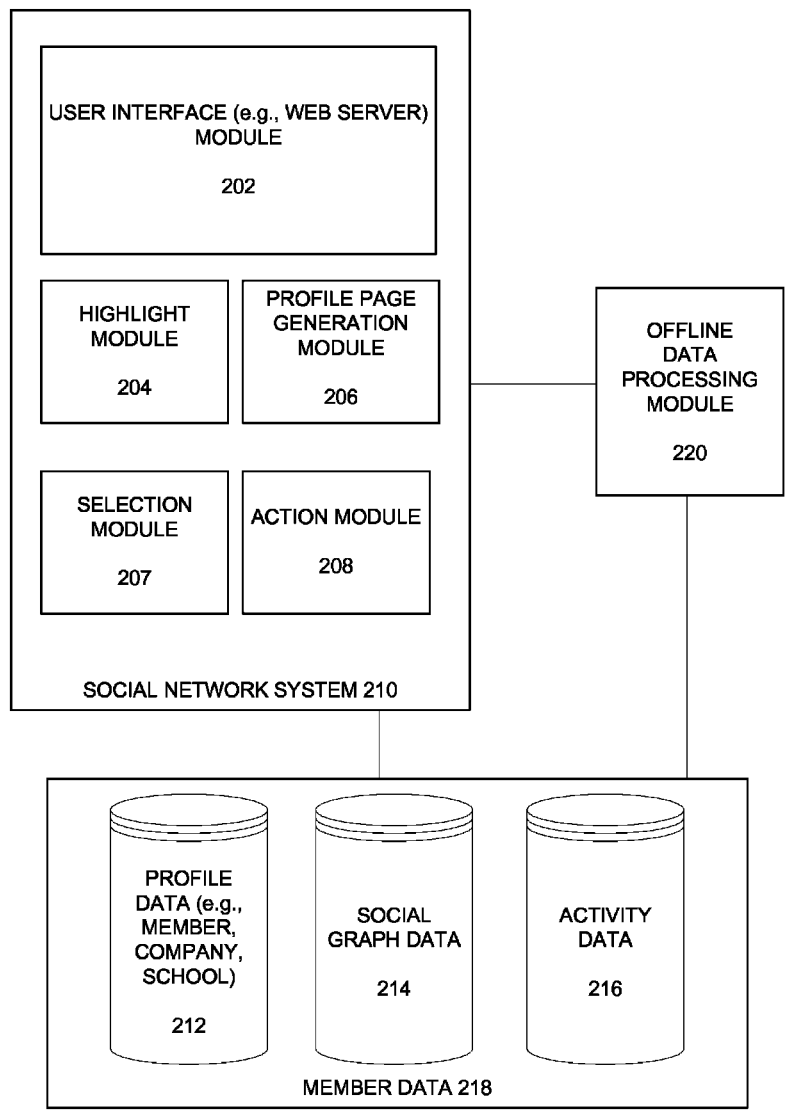
FIG. 2 is a block diagram illustrating various modules of a social network service, according to various embodiments.

FIG. 2 is a block diagram illustrating components of a social network system 210, according to some example embodiments. The social network system 210 is an example of a network-based system 105 of FIG. 1. The social network system 210 can include a user interface module 202, an highlight module 204, a profile page generation module 206, a selection module 207, and an action module 208, all configured to communicate with each other (e.g., via a bus, shared memory, or a switch).

Additionally, the social network system 210 can communicate with the database 115 of FIG. 1, such as a database storing member data 218. The member data 218 can include profile data 212, social graph data 214, and activity data 216. For example, using profile data 212, the highlight module 204 can determine a profile attribute. Additionally, the highlight module 204 can determine a network attribute using social graph data 214. Furthermore, the highlight module 204 can determine an event attribute using activity data 216.

In some instances, the highlight module 204 can be configured to process data offline or periodically using an offline data processing module 220. For example, the offline data processing module 220 can include Hadoop servers that access the member data 218 periodically (e.g., on a nightly basis). Processing the member data 218, such as generating an overall score for each member attribute (e.g., profile attribute, network attribute, and event attribute), and generating a list of member attributes may be computationally intensive. Therefore, due to hardware limitations and to ensure reliable performance of the social network, some of the calculation and forecasting can be done offline. For example, some of the parameters (e.g., overall score, an entity score, a network score, an event score, an entity coefficient, a network coefficient, and an event coefficient) can be calculated offline. Additionally, the generated ranked list for each parameter can be calculated offline. Therefore, these parameters can be inputted in the highlight module 204 (e.g., consolidation module) in real-time in order to almost instantaneously present the featured member attributes to the viewer.

As will be further described with respect to FIGS. 3-7, the highlight module 204, in conjunction with the user interface module 202 and profile page generation module 206, can present a personalized member profile page that is relevant and specific to a viewer.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database 115, or device 130, 150 may be distributed across multiple machines, databases 115, or devices 130, 150.

As shown in FIG. 2, the member data 218 includes a database for storing the profile data 212, including both member profile data, viewer profile data and profile data for various organizations. Additionally, the member data 218 can store the social graph data 214 and the activity data 216.

In some embodiments, the member data 218 may be processed (e.g., real-time, background/offline) using the highlight module 204 to calculate an overall score for each member attribute associated with a member. As previously mentioned, a member attribute can either be an entity attribute, a network attribute, or an event attribute.

An entity attribute can be derived from the profile data 212. Additionally, using the profile data 212 and viewer data, an entity score can be calculated. The highlight module 204 and the entity module 305 (FIG. 3) can use the entity score to determine whether an entity attribute is a featured member attribute. An entity attribute can be a featured member attribute when the entity score multiplied by an entity coefficient is higher than overall scores associated with other member attributes. FIG. 4 further describes techniques for determining a featured member attribute.

For instance, with many social network services, when a user 132, 152 registers to become a member, the member is prompted to provide a variety of personal and employment information to be displayed in the member's personal web page. Such information is commonly referred to as entity attributes. The entity attributes that are commonly requested and displayed as part of a member's profile include the member's age, birthdate, gender, interests, contact information, residential address, home town and/or state, spouse and/or family members, educational background (e.g., schools, majors, matriculation and/or graduation dates, etc.), employment history, office location, skills, professional organizations, and so on.

In some embodiments, the entity attributes may include the various skills that each member has indicated he or she possesses. Additionally, the entity attributes may include skills for which a member has been endorsed.

With certain social network services, such as some business or professional network services, the entity attributes may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Another example of the profile data 212 can include data associated with a company page. For example, when a representative of an entity initially registers the entity with the social network service, the representative may be prompted to provide certain information about the entity. This information may be stored, for example, in the database 115 and displayed on a company profile page. This type of profile data 212 can also be used in generating the personalized profile page described herein.

Additionally, social network services provide their users 132, 152 with a mechanism for defining their relationships with other people. This digital representation of real-world relationships is frequently referred to as a social graph.

In some instances, the social graph data 214 can be based on a member's presence within the social network service. For example, consistent with some embodiments, a social graph is implemented with a specialized graph data structure in which various members are represented as nodes connected by edges. The social graph data 214 can be used by the highlight module 204 and the network module 310 of FIG. 3 to determine to network attributes. Additionally, using the social graph data 214 and viewer data, the highlight module 204 can calculate a network score and a network coefficient. The network score multiplied by the network coefficient can determine the overall score. In cases when the overall score for a network attribute is higher than the overall score of other member attributes, the network attribute can be a featured member attribute. As previously mentioned, the profile page generation module 206 can include the featured member attribute when generating a personalized profile page that is specific to a viewer.

In addition to hosting a vast amount of social graph data 214, many social network services maintain activity data 216. An event attribute can be based on information accessed from the activity data 216. The activity data 216 can include an access log, profile page views, entity page views, newsfeed postings, birthday information, and clicking on links on the social network system 210. Additionally, the activity data 216 can include information associated with applications and services that allow members the opportunity to share and receive information, often customized to the interests of the member. In some embodiments, members may be able to self-organize into groups, or interest groups, organized around subject matter or a topic of interest.

The activity data 216 can be used by the highlight module 204 and the event module 315 (FIG. 3) to determine to event attributes. Additionally, using the activity data 216 and viewer data, the highlight module 204 can calculate an event score and an event coefficient. The event score multiplied by the event coefficient can determine the overall score. In cases when the overall score for an event attribute is higher than the overall score of other member attributes, the event attribute can be a featured member attribute. As previously mentioned, the profile page generation module 206 can include the featured member attribute when generating a personalized profile page that is specific to a viewer.

Figure 3:
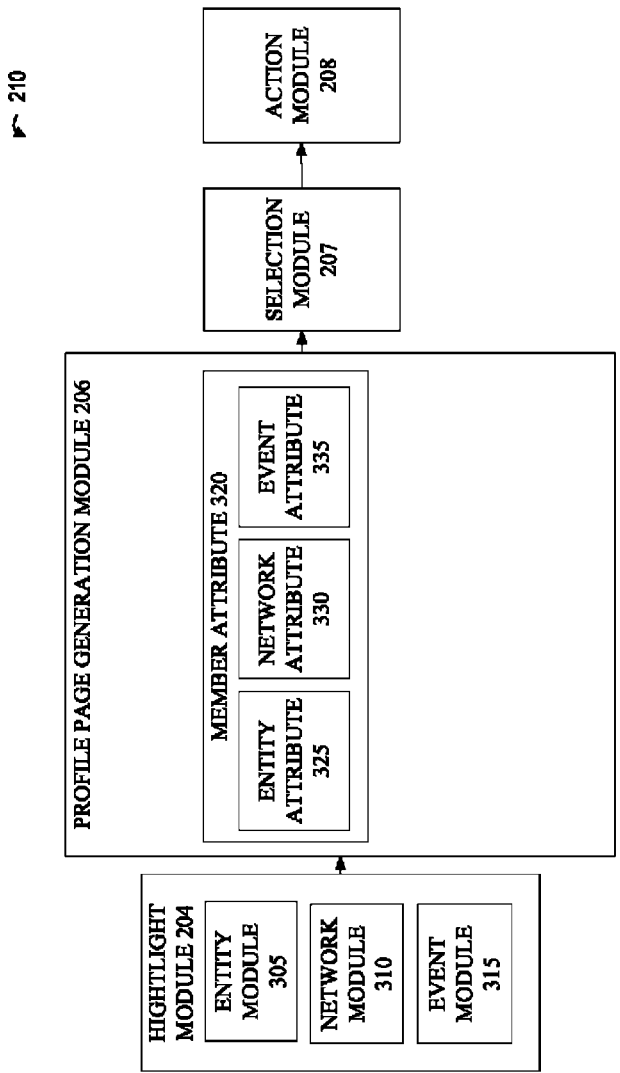
FIG. 3 a block diagram illustrating various modules of a social network system for determining a member attribute, recommending an action, and performing an action based on a user input, according to various embodiments.
Figure 4:
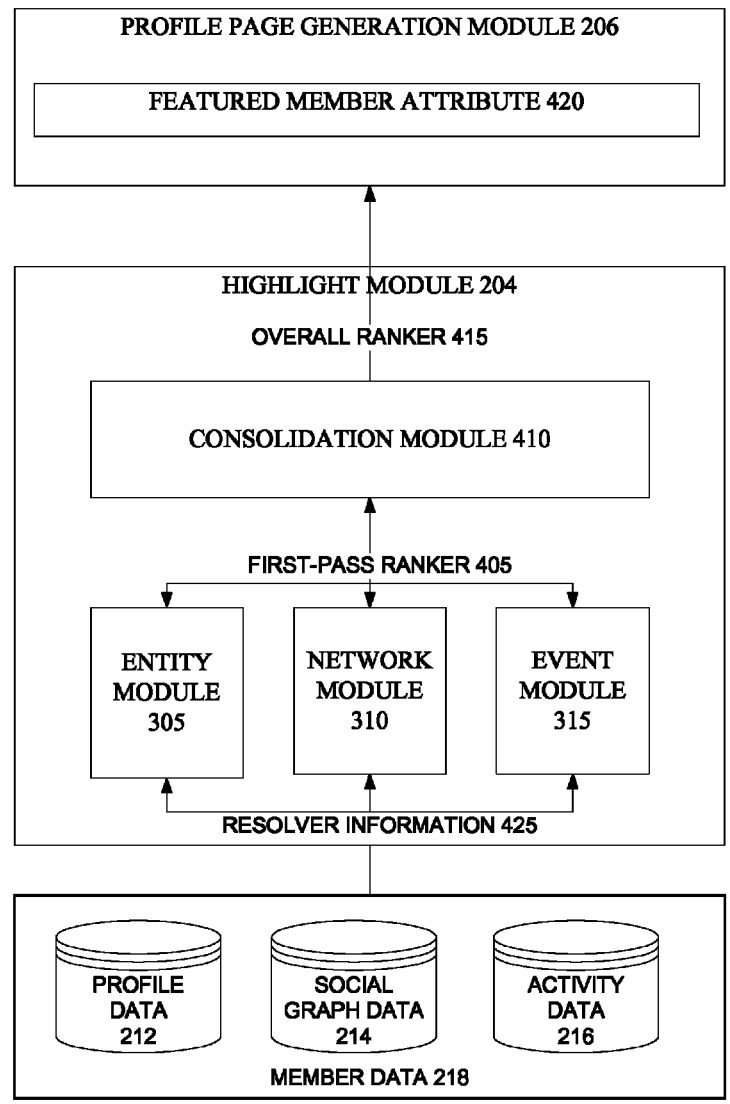
FIG. 4 a block diagram illustrating various modules of a highlight module and profile page generation module for presenting a featured member attribute, according to various embodiments.

FIG. 3 is a block diagram illustrating components of a social network system 210 for determining a member attribute, recommending an action, and performing an action based on a user input, according to some example embodiments.

The highlight module 204 can include an entity module 305, a network module 310, and an event module 315. The entity module 305 can access profile data 212 of the member, and access viewer data (e.g., profile data 212 of the viewer). Additionally, an entity attribute 325 can be derived from the profile data 212 of the member. Furthermore, an entity score associated with the entity attribute 325 can be calculated based on the profile data 212 of the member and the viewer data.

The network module 310 can access social graph data 214 of the member, and access viewer data (e.g., social graph data 214 of the viewer). Additionally, a network attribute 330 can be derived from the social graph data 214 of the member. Furthermore, a network score associated with the network attribute 330 can be calculated based on the social graph data 214 of the member and the viewer data.

The event module 315 can access activity data 216 of the member, and access viewer data (e.g., profile data 212 and social graph data 214) of the viewer. Additionally, an event attribute 335 can be derived from the activity data 216 of the member. Furthermore, an event score associated with the event attribute 335 can be calculated based on the activity data 216 of the member and the viewer data.

The profile page generation module 206 can generate a personalized profile page based on a member attribute 320. The member attribute 320 can either be the entity attribute 325, the network attribute 330, or the event attribute 335. The profile page generation module 206 can include featured member attributes in a personalized profile page. A member attribute 320 can be a featured member attribute when the overall score of the member attribute 320 is higher than the overall score of other member attributes. As previously described, the overall score is calculated by multiplying: the entity attribute 325 by the entity coefficient; the network attribute 330 by the network coefficient; or the event attribute 335 by the event coefficient.

In some instances, the personalized profile page can include a plurality of featured member attributes. Additionally, the personalized profile page may only include featured member attributes when at least a predetermined number of member attributes have a high enough overall score to be a featured member attribute.

For example, a personalized profile page can include a predetermined number of featured member attributes (e.g., highlights) based on the specific viewer. Additionally, the profile page generation module 206 can emphasize or highlight the featured member attribute to capture the viewer's attention.

Furthermore, in some instance, the viewer may select (e.g., click) the featured member attribute on the personalized profile page. In response to the selection, the selection module 207 can determine and recommend (e.g., present) a recommended action to the viewer. For example, the selection module 207 can present a popup window to the viewer with the recommended action, such as a recommendation to message the member. Continuing with the example, the viewer can send a confirmation to perform the recommended action with a user input. In response to the confirmation, an action module 208 can perform the action, such as draft a message to the member on behalf of the viewer, or send a connection request to the member.

Example member features based on member data and viewer data are described. For example, the viewer can be a recruiter, sales solutions subscriber, active job seeker, marketer, and so on. When the viewer is a recruiter, the member attributes 320 can include features describing positions the recruiter is hiring for, such as required skills, experience, and education. When the viewer is a sales professional, the member attributes 320 include features describing types of companies and seniority of leads the viewer is interested in selling to, or contacting.

Additionally, a member attribute 320 can be based on a comparison of skills on the profiles of the member and the viewer. A member attribute 320 can also include information related to the shortest distance between the viewer and member in the connections graph.

Furthermore, a member attribute 320 can be based on the member and the viewer's industries, skills and levels of expertise in those skills, work experience (e.g., companies, titles), and education (e.g., schools, fields of study, degrees) as analyzed by the highlight module 204. The highlight module 204 can compare the degree of similarity between these dimensions to calculate a score (e.g., overall score) for these member attributes 320.

Moreover, member attributes 320 can be based on the representations of the member and the viewer's networks of connections. The network of connection can include industries, companies, roles/titles, network-level skills profiles (e.g., 50% of people in viewer's network are skilled in Sales, 70% of people in member's network are skilled in Sales, etc.). The overall score for each of these member attributes 320 can be calculated based on the degree of similarity between the two members' networks based on the number of connections in common, and similarities between the aforementioned dimensions.

A member attribute 320 can also include content post, company overlap, connections in common, education in common, network insight, job opening at member's current or past company, skill expertise, and so on. The overall score can be based on details associated with the member attribute 320. Details associated with the member attribute 320 may include background contents of the member attribute 320; company; title; school; content features (if the highlight is a post) such as topics and keywords; skills associated with the member attribute 320 (e.g., skills relevant to a content post, skills on viewer's profile, and so on). Additionally, the overall score can be based on the timeframe associated with the member attribute 320 (e.g., recent content post versus education obtained 15 years ago).

FIG. 4 a block diagram illustrating various modules of the highlight module 204 and profile page generation module 206 for calculating an overall score in order to determine a featured member attribute, according to various embodiments.

The highlight module 204 can include the entity module 305, the network module 310, the event module 315, and a consolidation module 410. The entity module 305, the network module 310, and the event module 315 can generate a first-pass ranker (FPR) 405 of candidate featured member attributes (e.g., candidate highlights) to possibly include in the personalized profile page. The consolidation module 410 receives the FPR 405, and generates an overall ranker 415 which determines the featured member attributes to be included in the personalized profile page.

The entity module 305 sends to the consolidation module 410 an FPR 405 associated with entity attributes 325. As previously mentioned, an entity attribute 325 can be derived from the member data 218, and specifically from the profile data 212. The FPR 405 from the entity module 305 includes a ranked list of entity attributes 325 and their corresponding entity score. In some instances the FPR 405 also includes a uniform resource locator (URL) corresponding to each entity attribute 325. For example, the URL can be used by device 130 or profile page generation module 206 to retrieve the information associated with the entity attribute 325 in order to present the information on a profile page. An example of an FPR 405 is a <list of URL, score>. The URL corresponds to a unique identifier for a member attribute 320 (e.g., entity attribute 325).

Additionally, the entity module 305 can receive resolver information 425 from the social network system 210. The resolver information 425 can be used to calculate the entity score for an entity attribute 325. For example, resolver information 425 can include past performance data associated with the entity attribute 325. Additionally, the resolver information 425 can include a reference to the entity attribute 325 based on the corresponding URL.

The network module 310 sends to the consolidation module 410 an FPR 405 associated with network attributes 330. As previously mentioned, a network attribute 330 can be derived from the social graph data 214. The FPR 405 from the network module 310 includes a ranked list of network attributes 330 and their corresponding network score. In some instances the FPR 405 also includes a URL corresponding to each network attribute 330. For example, the URL can be used to retrieve the information associated with the network attribute 330. Additionally, the network module 310 can receive resolver information 425 from the consolidation module 410. The resolver information 425 can be used to calculate the network score for a network attribute 330. For example, resolver information 425 can include past performance data associated with the network attribute 330. Additionally, the resolver information 425 can include a reference to the network attribute 330 based on the corresponding URL.

The event module 315 sends to the consolidation module 410 an FPR 405 associated with event attributes 335. As previously mentioned, the event attribute 335 can be derived from the activity data 216. The FPR 405 from the event module 315 includes a ranked list of event attributes 335 and their corresponding event score. In some instances the FPR 405 also includes a URL corresponding to each event attribute 335. For example, the URL can be used to retrieve the information associated with the event attribute 335. Additionally, the event module 315 can receive resolver information 425 from the consolidation module 410. The resolver information 425 can be used to calculate the event score for an event attribute 335. For example, resolver information 425 can include past performance data associated with the event attribute 335. Additionally, the resolver information 425 can include a reference to the event attribute 335 based on the corresponding URL.

For example, the entity module 305, the network module 310, and the event module 315 can each transmit an FPR 405 which has a plurality (e.g., ten) of member attributes 320 for each module. In some instances, the processing to generate the FPR 405 can be performed online by the social network system 210 or offline by the offline data processing module 220.

Then, the consolidation module 410 can generate an overall ranker 415 based on the received FPR 405 from the entity module 305, the received FPR 405 from the network module 310, and the received FPR 405 from the event module 315. The overall ranker 415 can sometimes be referred to as a second pass ranker. The overall ranker 415 includes a member attribute 320 with a corresponding overall score. The profile page generation module 206 can use the overall ranker 415 to determine a featured member attribute 420 (e.g., highlight). For example, the featured member attribute 420 is included in the profile page of a member when a viewer visits the profile page. In some instances, the featured member attributes 420 are the member attributes 320 with the highest overall scores. For example, the profile page can include three featured member attributes 420 that correspond to the member attributes 320 with the three highest overall scores.

In some instances, the consolidation module 410 (e.g., a feed-mixer) can generate a home page feed and a profile page using the overall ranker 415. The overall ranker 415 consolidates all of the member attributes 320 (e.g., highlights) from the modules (e.g., the entity module 305, the network module 310, and the event module 315). Additionally, using an online relevance model, the consolidation module 410 applies a coefficient (e.g., multiplier) to each of the scores (e.g., entity score, network score, event score). Subsequently, the consolidation module 410 re-ranks the member attributes based on the coefficient. The coefficient is based on past performance data. Examples of past performance data include the probability that a viewer will interact with a specific member attribute 320 based on past viewer interactions with the specific member attribute 320. Another example of past performance data includes the type of actions previously performed by a viewer based on a featured member attribute 420 presented on a profile page.

The overall ranker 415 can include a new list of URLs and corresponding overall scores. The new list of URLs can be ranked (e.g., ordered) based on the overall score for each URL. Additionally, the consolidation module 410 can generate resolver information 425. The resolver information 425 can resolve (e.g., reference) each of the URLs to a corresponding member attribute 320.

Figure 5:
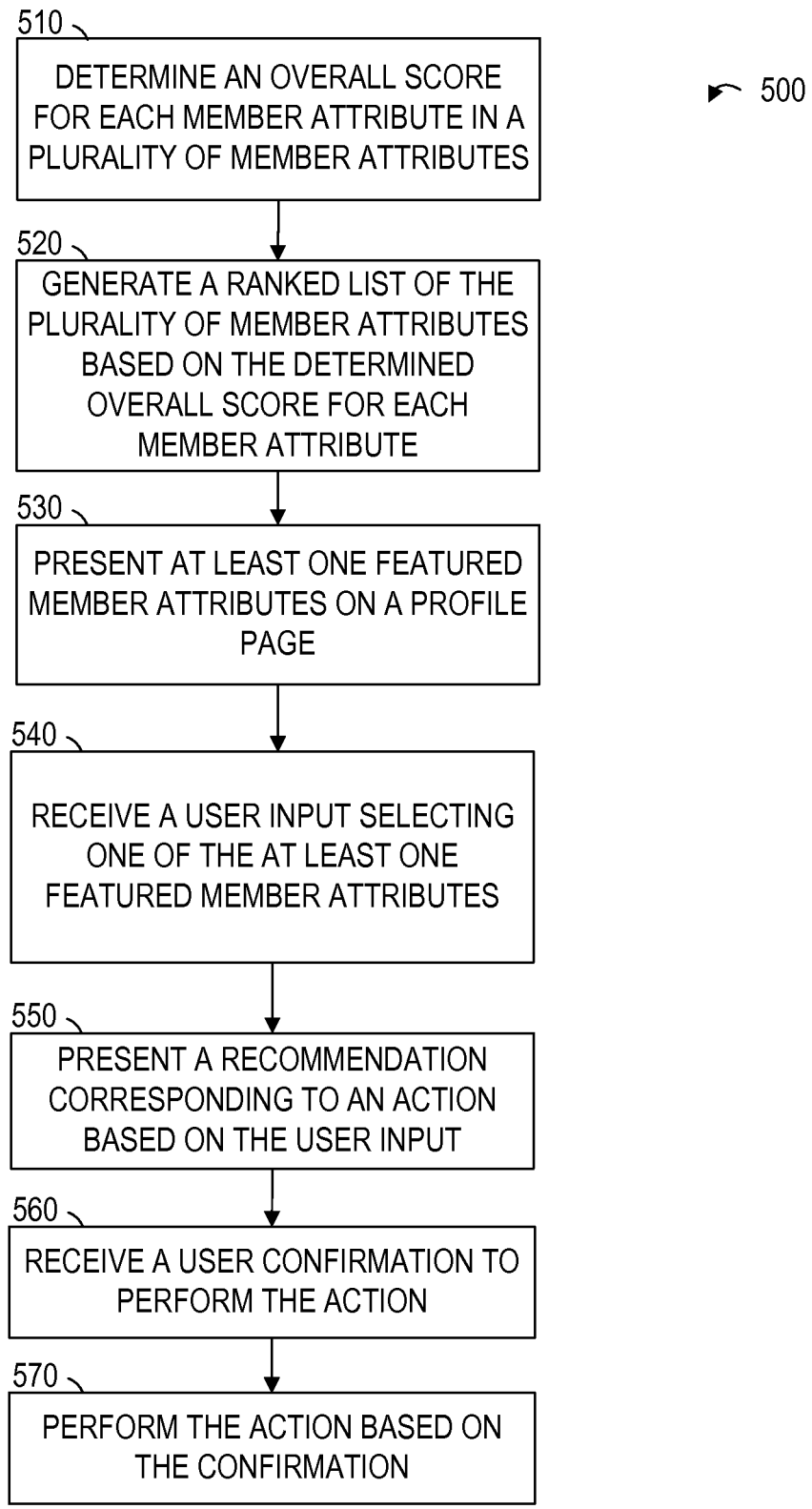
FIG. 5 is a flowchart illustrating a method of personalizing a member profile and performing an action based on interactions with a viewer, according to various embodiments.

FIG. 5 is a flowchart illustrating a method 500 for presenting a personalizing a member profile and performing an action based on interactions with a viewer, according to various embodiments. Operations in the method 500 may be performed by the network-based system 105, using modules described above with respect to FIGS. 2-4. As shown in FIG. 5, the method 500 includes operations 510, 520, 530, 540, 550, 560, and 570.

Figure 7:
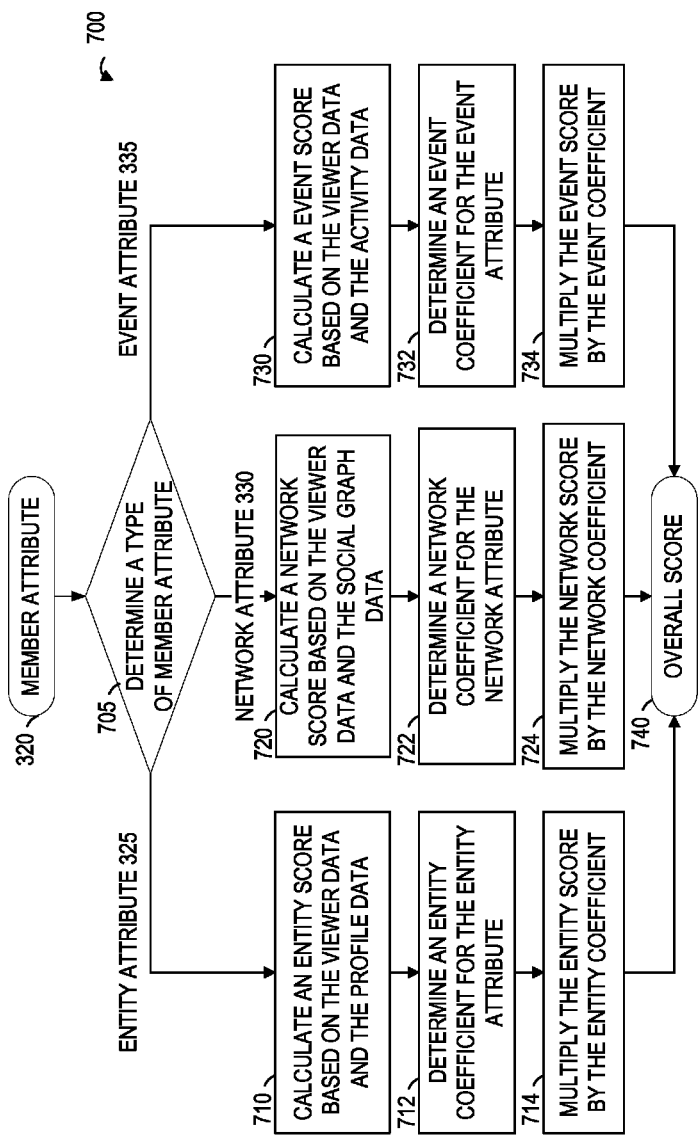
FIG. 7 is a flowchart illustrating a method of calculating an overall score of a member attribute to be utilized for personalizing a member profile, according to various embodiments.

At operation 510, the highlight module 204 can determine an overall score for each member attribute 320 in a plurality of member attributes. FIG. 7 describes techniques for calculating an overall score for each member attribute 320 to be used in an overall ranker 415.

At operation 520, the highlight module 204 can generate a ranked list of the plurality of member attributes based on the determined overall score for each member attribute 320. For example, as described in FIG. 4, the highlight module 204 can generate an overall ranker 415. The overall ranker 415 can include a list of member attributes and an overall score for each corresponding member attribute 320.

At operation 530, the profile page generation module 206 can present at least one featured member attribute 420 on a profile page. The featured member attribute 420 is a member attribute 320 with an overall score higher than overall scores associated with other member attributes. For example, the featured member attribute 420 can be the top member attribute in the generated ranked list (e.g., overall ranker 415) of the plurality of member attributes.

At operation 540, the selection module 207 can receive a user input selecting one of the at least one featured member attributes 420. An example of a user input can include a viewer clicking the featured member attribute 420 (e.g., highlight).

At operation 550, the selection module 207 can present a recommendation corresponding to an action based on the user input. Continuing with the example, in response to a user clicking on the highlight, the selection module 207 can present a graphical user interface (e.g., popup window) which includes a recommended action, such as a recommendation to message the member.

At operation 560, the action module 208 can receive a user confirmation to perform the action. The user can confirm to proceed with the recommendation with a confirmation. Continuing with the example, when receiving the recommendation, the user can press a confirm button on the graphical user interface.

At operation 570, the action module 208 can perform the action based on the confirmation. Example actions include, but are not limited to, sending a connection request to the member, messaging the member through a messaging application in the social network system 210, or emailing the member.

Figure 6:
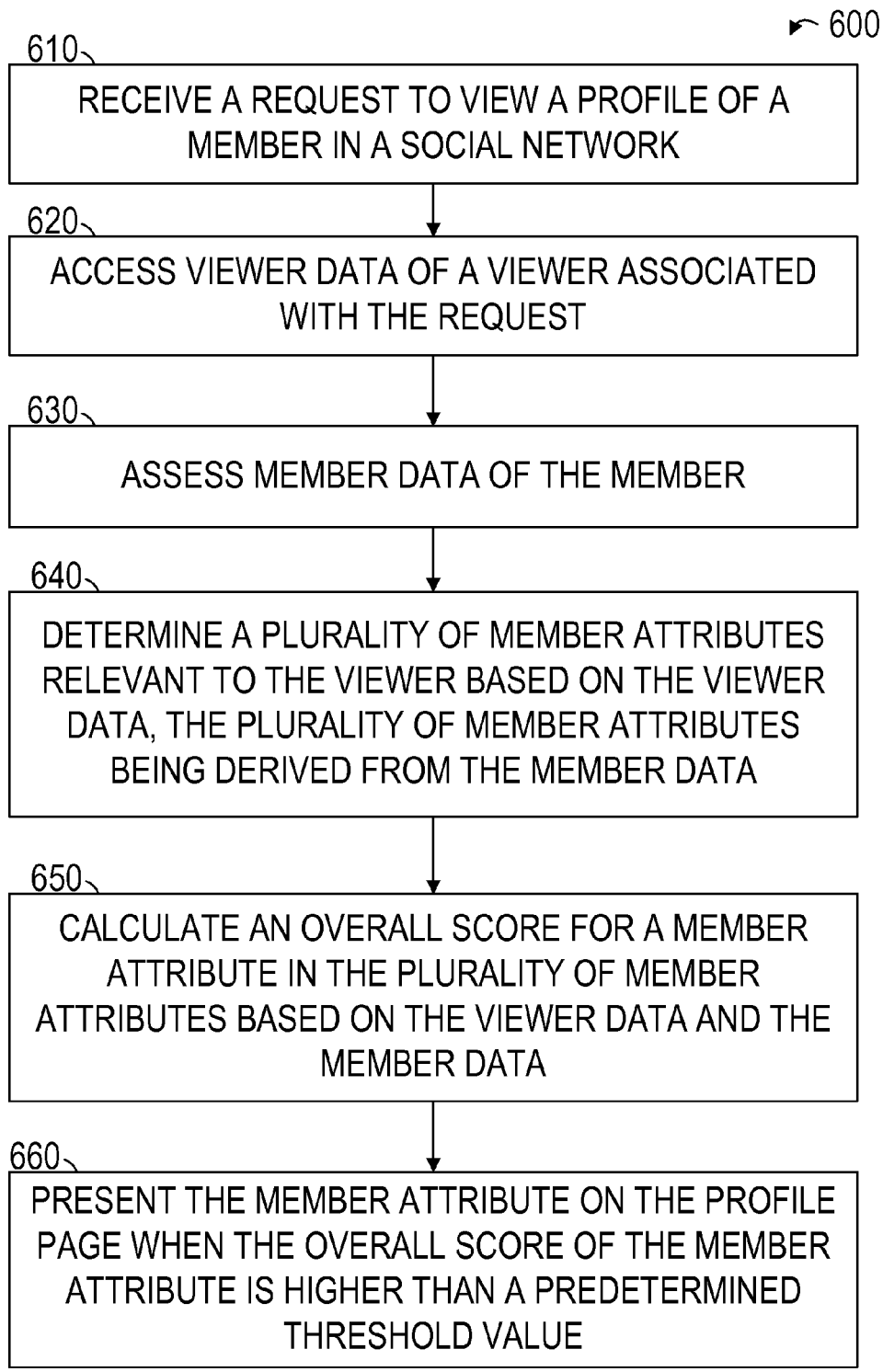
FIG. 6 is a flowchart illustrating a method of personalizing a member profile based on information accessed from a profile of a viewer, according to various embodiments.

FIG. 6 is a flowchart illustrating a method 600 for personalizing a member profile based on information accessed from a profile of a viewer, according to various embodiments. Operations in the method 600 may be performed by the network-based system 105, using modules described above with respect to FIGS. 2-4. As shown in FIG. 6, the method 600 includes operations 610, 620, 630, 640, 650, and 660.

At operation 610, the social network system 210 can receive a request to view a profile of a member in a social network. For example, user 132, using device 130, may want to view the profile page corresponding to a member of the social network system 210. In this example, user 132 is referred to as the viewer. The request can be transmitted from device 130 to the highlight module 204.

At operation 620, the social network system 210 can access viewer data of a viewer associated with the request. Continuing with the example, in response to receiving the request from operation 610, the highlight module 204 can access the viewer data of the viewer (e.g., user 132). The viewer data can include profile data 212, social graph data 214, and activity data 216 associated with the viewer.

At operation 630, the social network system 210 can access member data 218 of the member. Continuing with the example, in addition to accessing the viewer data, the highlight module 204 accesses member data 218 of the member associated with the profile page that the viewer has requested to view. As described in FIG. 2, the member data 218 includes profile data 212 of the member, social graph data 214 of the member, and activity data 216 of the member. In some instances, the profile data 212 is accessed by the entity module 305, the social graph data 214 is accessed by the network module 310, and the activity data 216 is accessed by the event module 315.

At operation 640, the social network system 210 can determine a plurality of member attributes relevant to the viewer based on the viewer data. The plurality of member attributes is derived from the member data. For example, the consolidation module 410 can generate the overall ranker 415 as described in FIG. 4. The overall ranker 415 can include a list of URLs associated with each member attribute 320 in the plurality of member attributes, and an overall score corresponding to each member attribute 320 in the plurality of member attributes. FIG. 7 describes techniques for generating the overall ranker 415.

In some instances, each member attribute 320 is associated with a unique URL. Additionally, the highlight module 204 can transmit to the device 130 the unique URL associated with the member attribute 320. Alternatively, the highlight module 204 can transmit the unique URL to the profile page generation module 206, and the profile page generation module 206 can use the unique URL to obtain the information to generate the highlight on the profile page.

At operation 650, the social network system 210 (e.g., profile page generation module 206) can calculate an overall score for a member attribute 320 in the plurality of member attributes based on the viewer data and the member data. As previously mentioned, the overall ranker 415 includes an overall score for each member attribute 320 in the plurality of the member attributes. FIG. 7 describes techniques for calculating the overall score.

In some instances, the highlight module 204 can determine an overall score for each member attribute 320 in the plurality of member attributes. Additionally, the highlight module 204 can generate a ranked list (e.g., overall ranker) of the plurality of member attributes based on the overall score for each member attribute 320 in the plurality of member attributes.

At operation 660, the social network system 210 can cause the presentation of the member attribute 320 on the profile page when the overall score is higher than a predetermined threshold value. A member attribute 320 having an overall score that is higher than the predetermined threshold value is an example of a featured member attribute 420, as described in FIG. 4. Continuing with the example, the profile page generation module 206 can use the overall ranker 415 to determine a featured member attribute 420. Then, the profile page generation module 206 can generate a personalized profile page of the member that is specific to the viewer by including the featured member attribute 420.

In some instances, the member attribute 320 is only presented on the profile page when at least a predetermined number of member attributes are higher than the predetermined threshold value.

Additionally, the profile page generation module 206 can cause the presentation of at least one featured member attribute 420 on the profile page. The at least one featured member attribute 420 has an overall score that is higher than other overall scores associated with remaining member attributes 320 in the rank list (e.g., overall ranker 415). For example, the featured member attribute 420 can be the top predetermined number of (e.g., top three) member attributes 320 in the generated ranked list of the plurality of member attributes 320 (e.g., overall ranker 415).

FIG. 7 is a flowchart illustrating a method 700 for calculating an overall score of a member attribute 320 based on an entity score, a network score or an event score, according to various embodiments. Operations in the method 700 may be performed by the network-based system 105, using modules described above with respect to FIGS. 2-4. As shown in FIG. 7, the method 700 includes operations 705, 710, 712, 714, 720, 722, 724, 730, 732, 734, and 740.

At operation 705, the highlight module 204 can determine a type of a member attribute 320.

When the determined type of the member attribute 320 is an entity attribute 325, the entity module 305 can calculate an entity score based on the viewer data and the profile data 212 at operation 710. Then, at operation 712, the highlight module 204 (e.g., consolidation module 410) can determine an entity coefficient for the entity attribute 325. The entity coefficient can be based on past performance data associated with the entity attribute 325, such as the likelihood of the viewer clicking a highlight or requesting to perform a recommended action. Subsequently, at operation 714, highlight module 204 (e.g., consolidation module 410) can multiply the entity score by the entity coefficient to calculate the overall score, at operation 740, of the member attribute 320. As previously discussed, the consolidation module 410 can generate an overall ranker 415 that includes a list of the member attributes 320 and their corresponding overall scores.

For example, the entity attribute 325 includes information related to a common employer for the member and the viewer, a common educational institution for the member and the viewer, information related to a skill of the member, or other information derived from the profile data 212 of the member and the viewer data.

When the determined type of the member attribute 320 is a network attribute 330, the network module 310 can calculate a network score based on the viewer data and the social graph data 214 at operation 720. Then, at operation 722, the highlight module 204 can determine a network coefficient for the network attribute 330. The network coefficient can be based on past performance data associated with the network attribute 330, such as the likelihood of the viewer clicking a highlight or requesting to perform a recommended action. Subsequently, at operation 724, the highlight module 204 (e.g., consolidation module 410) can multiply the network score by the network coefficient to calculate, at operation 740, the overall score of the member attribute 320.

For example, the network attribute 330 includes information related to a job opening at an employer of the member, a connection of the member in the social network, or other information derived from the social graph data 214 of the member and the viewer data.

When the determined type of the member attribute 320 is an event attribute 335, the event module 315 can calculate an event score based on the viewer data and the activity data 216 at operation 730. Then, at operation 732, the highlight module 204 can determine an event coefficient for the event attribute 335. The event coefficient can be based on past performance data associated with the event attribute 335, such as the likelihood of the viewer clicking a highlight or requesting to perform a recommended action. Subsequently, at operation 734, the highlight module 204 (e.g., consolidation module 410) can multiply the event score by the event coefficient to calculate, at operation 740, the overall score of the member attribute.

For example, the event attribute 335 includes information related to a content posting in the social network by the member, or other information derived from the activity data 216 of the member and the viewer data.

Figure 8:
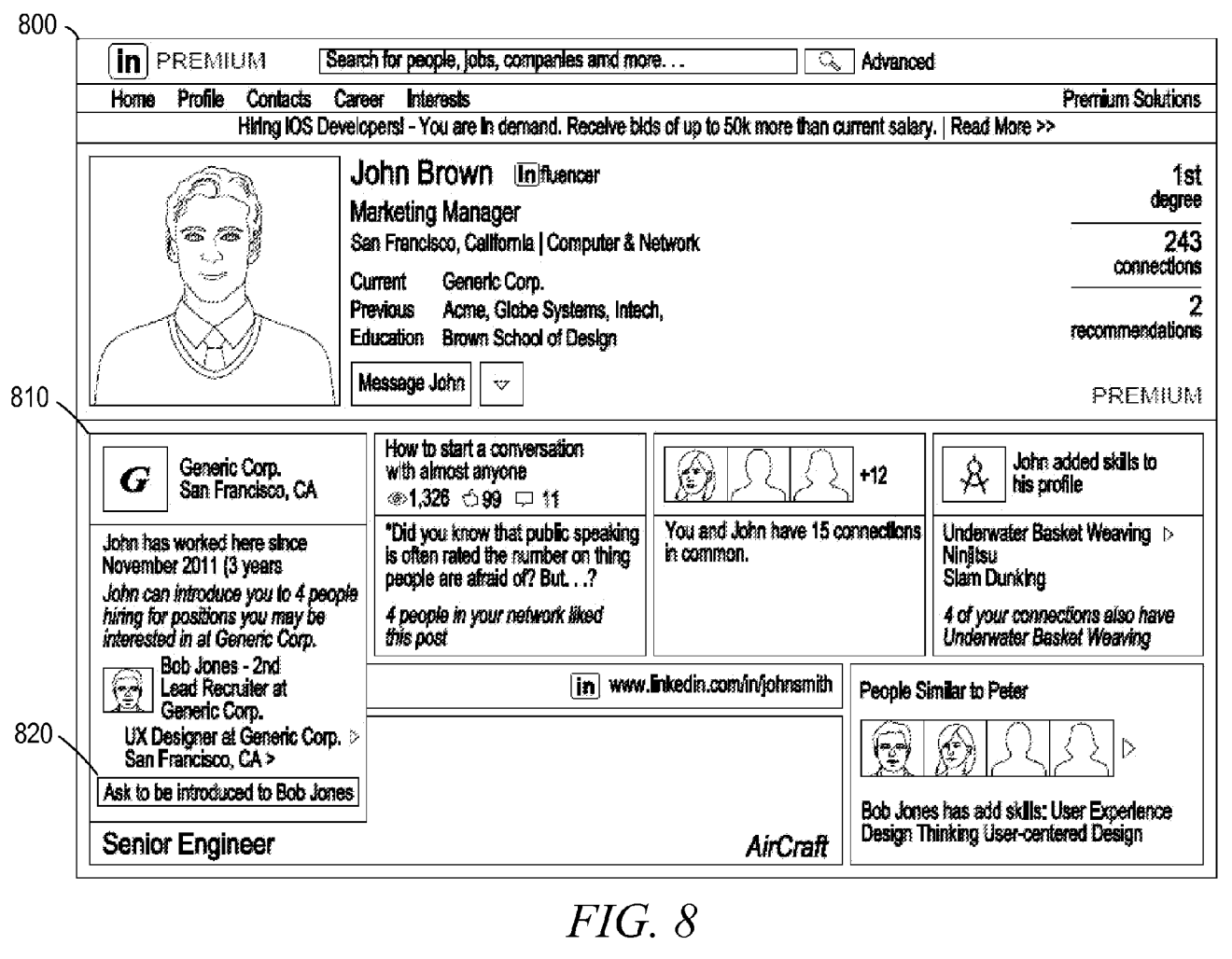

FIG. 8 is an example of a personalized member profile 800 of a member in a social network system 210, according to various embodiments. The personalized member profile 800 includes a highlight 810. The highlight 810 is an example of a featured member attribute 420. The highlight 810 is presented to a viewer based on information accessed from the profile data 212, social graph data 214, and activity data 216 of the viewer. In this example, the highlight 810 relates to information about the employer of the member. Additionally, the highlight 810 includes a recommendation 820 to ask the member to introduce the viewer to "4 people hiring for positions" that the viewer may be interested in. If the viewer confirms the recommendation 820 (e.g., asks for an introduction), then the action module 208 can ask the member to introduce the viewer to the member's network as recommended.

Figure 9:
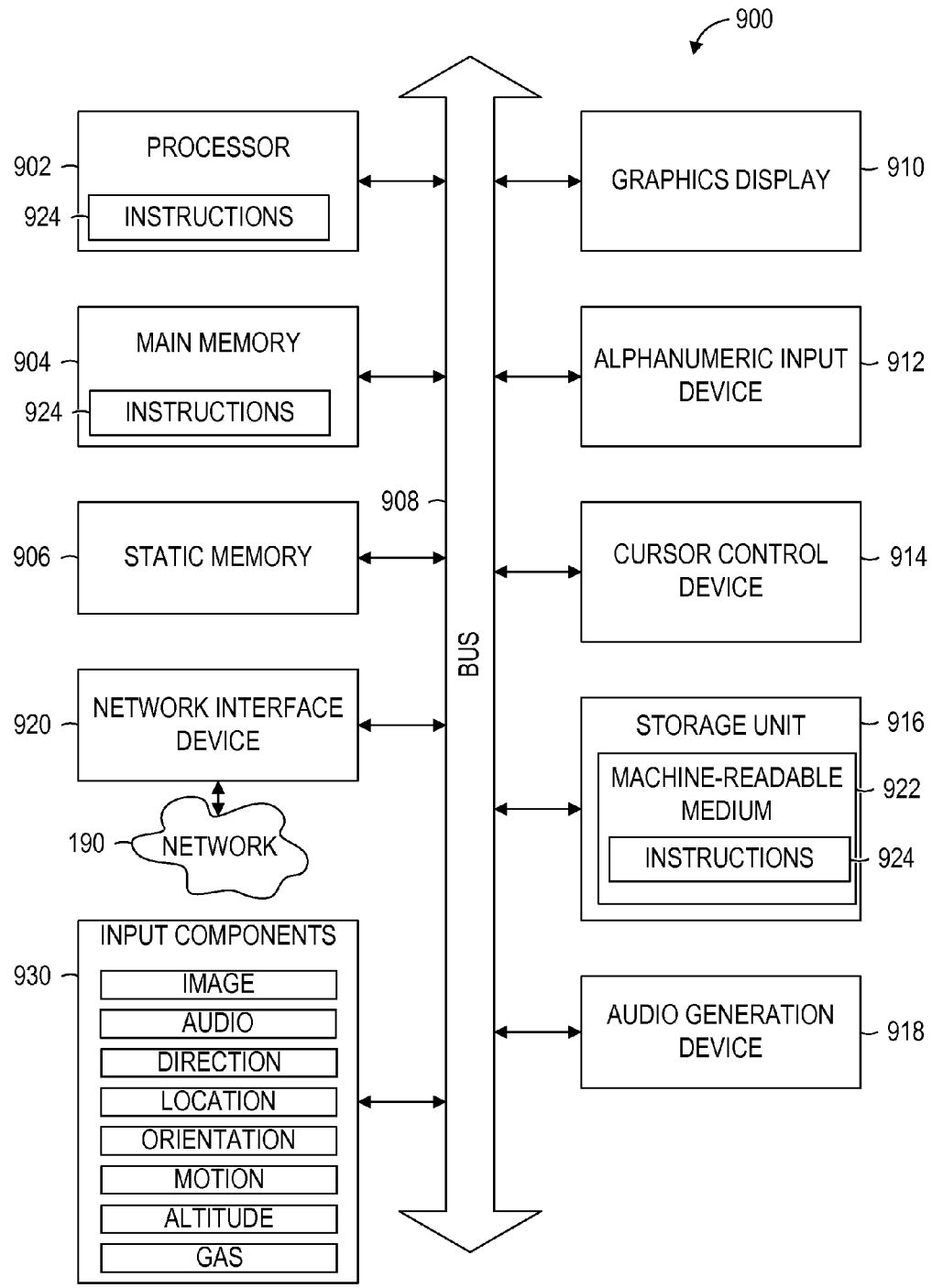
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device 130, 150 or may be connected (e.g., networked) to other machines. In a networked deployment, the machine 900 may operate in the capacity of a server machine 110 or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine 900 is illustrated, the term "machine" shall also be taken to include any collection of machines 900 that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or another pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media 922 (e.g., tangible and non-transitory machine-readable media). The instructions 924 may be transmitted or received over the network 190 via the network interface device 920. For example, the network interface device 920 may communicate the instructions 924 using any one or more transfer protocols (e.g., Hypertext Transfer Protocol (HTTP)).

In some example embodiments, the machine 900 may be a portable computing device, such as a smartphone or tablet computer, and may have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 930 may be accessible and available for use by any of the modules described herein.

As used herein, the term "memory" refers to a machine-readable medium 922 able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions 924. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 922 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 902 or other programmable processor 902. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 902 configured by software to become a special-purpose processor, the general-purpose processor 902 may be configured as respectively different special-purpose processors (e.g., comprising different hardware modules) at different times. Software (e.g., a software module) may accordingly configure one or more processors 902, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 908) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module implemented using one or more processors 902.

Similarly, the methods described herein may be at least partially processor-implemented, a processor 902 being an example of hardware. For example, at least some of the operations of a method may be performed by one or more processors 902 or processor-implemented modules. As used herein, "processor-implemented module" refers to a hardware module in which the hardware includes one or more processors 902. Moreover, the one or more processors 902 may also operate to support performance of the relevant operations in a "cloud computing" environment or as a "software as a service" (SaaS). For example, at least some of the operations may be performed by a group of computers (as examples of machines 900 including processors 902), with these operations being accessible via a network 190 (e.g., the Internet) and via one or more appropriate interfaces (e.g., an application programming interface (API)).

The performance of certain operations may be distributed among the one or more processors 902, not only residing within a single machine 900, but deployed across a number of machines 900. In some example embodiments, the one or more processors 902 or processor-implemented modules may be located in a single geographic location (e.g., within a home environment, an office environment, or a server farm). In other example embodiments, the one or more processors 902 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 900. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 900 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method for personalizing a profile page comprising:
receiving a request to view the profile page of a member in a social network;
accessing viewer data of a viewer associated with the request, the viewer being another member in the social network;
accessing member data of the member, the member data including profile data and social graph data, the social graph data including information related to a job opening at an employer of the member;
determining, using a processor, a plurality of member attributes relevant to the viewer based on the viewer data, the plurality of member attributes being derived from the member data;
calculating an overall score for a featured member attribute in the plurality of member attributes based on the viewer data and the member data, the overall score being calculated based on the information related to the job opening at the employer of the member;
causing a first presentation, on a display of a device of the viewer, of the featured member attribute on the profile page, when the overall score of the featured member attribute is higher than a predetermined threshold value;
receiving, from the device of the viewer, a user input selecting the featured member attribute based on the first presentation;
causing a second presentation, on the display of the device of the viewer, of a recommendation corresponding to an action based on the received user input;
receiving, from the device of the viewer, a confirmation to perform the action; and
performing the action based the received confirmation.

2. The method of claim 1, wherein the featured member attribute is associated with a unique uniform resource locator (URL), and the method further comprising:
transmitting, to the device, the unique URL associated the featured member attribute, when the overall score of the featured member attribute is higher than the predetermined threshold value.

3. The method of claim 1, wherein the member data further includes activity data.

4. The method of claim 1, wherein the featured member attribute is an entity attribute derived from the profile data, the overall score is derived from an entity score, and the method further comprising: calculating the entity score based on the viewer data and the profile data.

5. The method of claim 4, further comprising:
determining an entity coefficient based on past performance data associated with the entity attribute, the past performance data including a likelihood of confirming the recommendation; and
multiplying the entity score by the entity coefficient to derive the overall score of the member attribute.

6. The method of claim 4, wherein the featured entity attribute includes information related to a common employer for the member and the viewer, or a common educational institution for the member and the viewer.

7. The method of claim 4, wherein the featured entity attribute includes information related to a skill of the member.

8. The method of claim 1, wherein the featured member attribute is a network attribute derived from the social graph data, the overall score is derived from a network score, and the method further comprising: calculating the network score based on the viewer data and the social graph data.

9. The method of claim 8, further comprising:
determining a network coefficient based on past performance data associated with the network attribute; and
multiplying the network score by the network coefficient to derive the overall score of the featured member attribute.

10. The method of claim 8, wherein the network attribute includes information related to a job opening at an employer of the member.

11. The method of claim 8, wherein the network attribute includes information related to a connection of the member in the social network.

12. The method of claim 3, wherein the featured member attribute is an event attribute derived from the activity data, the overall score is derived from an event score, and the method further comprising:
calculating the event score based on the viewer data and the activity data.

13. The method of claim 12, further comprising:
determining an event coefficient based on past performance data associated with the event attribute; and
multiplying the event score by the event coefficient to derive the overall score of the featured member attribute.

14. The method of claim 12, wherein the event attribute includes information related to a content posting in the social network by the member.

15. The method of claim 1, wherein the featured member attribute is only presented on the profile page when at least a predetermined number of member attributes are higher than the predetermined threshold value.

16. The method of claim 1, further comprising:
determining an overall score for each member attribute in the plurality of member attributes;
generating a ranked list of the plurality of member attributes based on the overall score for each member attribute in the plurality of member attributes; and
causing a presentation of at least one featured member attribute on the profile page, the at least one featured member attribute having an overall score higher than other overall scores associated with remaining member attributes in the ranked list.

17. The method of claim 1, wherein the action is to message the member using a messaging application in the social network.

18. The method of claim 1, wherein the action is to email the member.

19. The method of claim 1, wherein the member data further includes a skill possessed by the member, a job title of the member, an employer of the member, or an industry associated with the member.

20. The method of claim 1, wherein the member is a person.

21. The method of claim 1, wherein the member data includes activity data, the method further comprising:
calculating an event score based on the viewer data and the activity data, and wherein the overall score is further derived from the event score.

22. A social network system comprising:
a first database having profile data;
a second database having social graph data, the social graph data including information related to a job opening at an employer of a member;
a third database having activity data;
one or more processors to:
receive a request to view a profile page of the member in the social network system;
access, from the first database and the second database, viewer data of a viewer associated with the request, the viewer being another member in the social network system;
access, from the first, second and third databases, member data of the member;
determine a plurality of member attributes relevant to the viewer based on the viewer data, the plurality of member attributes being derived from the member data;
calculate an overall score for a featured member attribute in the plurality of member attributes based on the viewer data and the member data, the overall score being calculated based on the information related to the job opening at the employer of the member
cause a first presentation, on a display of a device, of the featured member attribute on the profile page, when the overall score of the featured member attribute is higher than a predetermined threshold value;
receive, from the device of the viewer, a user input selecting the featured member attribute based on the first presentation;
cause a second presentation, on the display of the device of the viewer, of a recommendation corresponding to an action based on the received user input;
receive, from the device of the viewer, a confirmation to perform the action; and
perform the action based the received confirmation.

23. A non-transitory machine-readable storage medium comprising instructions that, when executed by one or more processors of a machine, cause the machine to perform operations comprising:
- receiving a request to view a profile page of a member in a social network;
- accessing viewer data of a viewer associated with the request, the viewer being another member of the social network;
- accessing member data of the member, the member data including profile data and social graph data, the social graph data including information related to a job opening at an employer of the member;
- determining, using a processor, a plurality of member attributes relevant to the viewer based on the viewer data, the plurality of member attributes being derived from the member data;
- calculating an overall score for a featured member attribute in the plurality of member attributes based on the viewer data and the member data, the overall score being calculated based on the information related to the job opening at the employer of the member;
- causing a first presentation, on a display of a device, of the featured member attribute on the profile page, when the overall score of the featured member attribute is higher than a predetermined threshold value;
- receiving, from the device of the viewer, a user input selecting the featured member attribute based on the first presentation;
- causing a second presentation, on the display of the device of the viewer, of a recommendation corresponding to an action based on the received user input;
- receiving, from the device of the viewer, a confirmation to perform the action; and
- performing the action based the received confirmation.

* * * * *

UNITED STATES PATENT AND TRADEMARK OFFICE
CERTIFICATE OF CORRECTION

PATENT NO. : 9,817,905 B2
APPLICATION NO. : 14/674755
DATED : November 14, 2017
INVENTOR(S) : Dave et al.

Page 1 of 1

It is certified that error appears in the above-identified patent and that said Letters Patent is hereby corrected as shown below:

In the Claims

Column 18, Line 67, Claim 1, after "based", insert --on--

Column 20, Line 51, Claim 22, after "member", insert --;--

Column 20, Line 67, Claim 22, after "based", insert --on--

Column 22, Line 17, Claim 23, after "based", insert --on--

Signed and Sealed this
Fourth Day of June, 2019

Andrei Iancu
*Director of the United States Patent and Trademark Office*